United States Patent Office

3,091,571
Patented May 28, 1963

3,091,571
EPIDEMIOLOGICAL ANTIMALARIAL PREPARATION AND METHOD OF ITS FORMATION
Martin E. Polinger, Scarsdale, N.Y., assignor to Burroughs Wellcome & Co. (U.S.A.) Inc., Tuckahoe, N.Y., a corporation of New York
No Drawing. Filed Sept. 5, 1961, Ser. No. 136,195
Claims priority, application Great Britain Sept. 30, 1960
5 Claims. (Cl. 167—65)

This invention relates to a novel composition for the clinical and epidemiological eradication of malaria. The composition consists of a combination of pyrimethamine and primaquine, in optimum proportions, as described below.

The combination is particularly effective in eradicating those forms of the malaria parasite which are directly involved in the transmission of the disease from man to the Anopheles mosquito, and back to man again.

The main forms of plasmodia in the human body are (1) erythrocytic forms (asexual schizonts and merozoites), which are responsible for the major clinical manifestation of the disease, (2) gametocytes (sexual forms) clinically inert but responsible for transmission to mosquitoes and thereby for spread and perpetuation of the disease, and (3) primary and secondary tissue forms, probably asexual; the secondary tissue forms of *Plasmodium vivax* are responsible for relapse.

*Plasmodium vivax* gametocytes are relatively short-lived. *Plasmodium falciparum* does not persist in secondary tissue forms, but its numerous gametocytes can circulate in the blood for as long as two months after destruction of the asexual blood forms.

Of the principal antimalarial drugs, chloroquine and pyrimethamine are schizonticides. Pyrimethamine, but not chloroquine, can also destroy the secondary tissue forms of *P. vivax*, although rather slowly and subject to special conditions. Neither drug clears falciparum gametocytes directly, but pyrimethamine can indirectly bring about ensuing sporogonic arrest in the mosquito. Chloroquine does not possess this property.

The 8-aminoquinoline drugs, of which primaquine is now the most favored, are prmarily active against tissue forms and gametocytes. They are of little or no value clinically to suppress acute attacks of malaria. Patients suffering from *P. falciparum* infections may harbor gametocytes in their blood for as much as a week, or even longer in some instances, when treated with primaquine alone. During a good part of this time, notably the first days, they can reinfect mosquitoes, thereby perpetuating the disease epidemiologically. This situation is not altered when schizonticides other than pyrimethamine, e.g., chloroquine, are administered along with the primaquine.

However, according to the invention the simultaneous administration of pyrimethamine and primaquine has the result, greatly surpassing all expectations, of eliminating gametocytes, most significantly those of *P. falciparum*, with unprecedented rapidity. Furthermore, it appears that the falciparium gametocytes are damaged in some way before their disappearance, so as to be incapable of infecting mosquitoes (i.e., no oocysts or sporozoites develop in mosquitoes fed on the patient's blood).

In accordance with the present invention, there is provided an antimalarial composition, characterized by the fact that it comprises a mixture of about 45 to 55 parts of 2,4-diamino-5-(p-chlorophenyl)-6-ethylpyrimidine or a salt thereof and about 35 to 50 parts of 8-(4-amino-1-methylbutylamino)-6-methoxyquinoline, the amounts being expressed in terms of equivalent base.

It has been discovered that the administration of such a composition is highly effective for the clinical and epidemiological eradication of malaria.

A preferred and highly effective proportion of the two components has been found to be 50 mg. of pyrimethamine and about 40 mg. of primaquine. Pyrimethamine is 2,4-diamino-5-(p-chlorophenyl) - 6 - ethylpyrimidine. Primaquine is 8-(4-amino-1-methylbutylamino)-6-methoxyquinoline. The amounts are expressed in terms of equivalent base, and refer to adult dosage. Lower doses, but in the same ratio, have been administered to children.

The findings to date may be summarized as follows:
(1) Very rapid clearance of *Plasmodium falciparum* gametocytes from the blood of man is reported herewith. A condensation of the first 10 cases appears on the attached chart. There were no failures. Complete clearance of these gametocytes was achieved after a single oral dose of the claimed combination. (2) Complete sporogonic arrest in the mosquito was also achieved, notably at the critical 24-hour and 48-hour marks, at which sporogonic breakthroughs have been recorded with other antimalarials and antimalarial combinations.

To illustrate this achievement: before medication with the claimed combination, control batches of mosquitoes were blood-fed on cases 7, 9 and 10. After medication, additional batches were blood-fed at 24 hours (cases 7, 9 and 10), 48 hours (cases 7 and 10), and 72 hours (case 10). Among the control batches, 61/72 (85%) were found to be infected upon subsequent dissection, compared with 0/77 (zero percent) among the post-drug batches.

(3) It was noted that no oocysts were found among mosquitoes blood-fed on cases which had received a single oral dose of the claimed combination. This aspect was given very close, specific study in an additional case, as follows:

Before medication, two control batches were blood-fed. Upon subsequent dissection a total of 10/14 (72%) mosquitoes were found to be infected, 6/9 in the first batch and 4/5 in the second. The number of oocysts per midgut in the first control batch (dissected 7 days later) averaged 93 (range 32 to 170). In the second control batch (dissected 9 days later) the average was 80 (range 44 to 105).

After medication, three batches were blood-fed, two at 24 hours and one at 48 hours. There was no infection among a total of 22 mosquitoes (dissected) 7, 8 and 9 days later. In addition, however, it is reported that not a single oocyst could be found on the midguts of these 22 mosquitoes.

(4) In addition to the foregoing effects, which are collectively unique, in excess of all expectations, and which hold forth great hope for the worldwide eradication of malaria, the claimed combination has achieved complete elimination of asexual blood and tissue forms of the parasite in man.

(5) The claimed combination has been uniformly well tolerated in all cases, and no clinical side-effects have been noted or reported.

TABLE 1

| Case No. | Age, Yrs. | Wt., Lbs. | "D"+P (mg. of base) Single Dose | Gametocytes Per Cubic mm. | | | | Clearance | |
|---|---|---|---|---|---|---|---|---|---|
| | | | | Before Drug (Count) | Post-Drug, High (Count) | Post-Drug, High (Hours) | Post-Drug, Low (Count) | Last Positive Film (Hours) | First Negative Film (Hours) |
| 1 | 7 | 40 | 12.5+10 | 4 | 30 | 6 | 0 | 54-78 | 78-102 |
| 2 | 5 | 30 | 12.5+10 | 23 | 31 | 3-6 | 0 | 46 | 71 |
| 3 | 2½ | 26 | 12.5+10 | 79 | 95 | 6 | 0 | 46 | 71 |
| 4 | 2½ | 30 | 12.5+10 | 149 | 417 | 6 | 0 | 71 | 95 |
| 5 | adult | 125 | 50+40 | 32 | 24 | 3-6 | 0 | 46 | 70 |
| 6 | 2 | 21 | a 6.3+5 | 396 | 134 | a 32 | 0 | a 122 | a 170 |
| 7 | 2½ | 25 | 12.5+10 | 700 | 525 | b 23 | 0 | 96 | 120 |
| 8 | 9 | 50 | 25+20 | 360 | 707 | 6 | 0 | 57 | 69 |
| 9 | 16 | 100 | 50+40 | 193 | 246 | b 30 | 0 | 71 | 95 |
| 10 | 9 | 40 | 12.5+10 | 162 | 81 | b 18 | 0 | 94 | 118 |
| Averages | | | | | | | 0 | 65-67 | 88-90 |

"D"—"Daraprim" brand pyrimethamine.
P—Primaquine
a Results excluded from the averages because of deliberate, experimental under-dosage. No observations between hour 122 and hour 170.
b No observations before hour 23 (Case 7), hour 12 (Case 9), hour 18 (Case 10).

It is not feasible to prepare a satisfactory compressed tablet of pyrimethamine base and primaquine diphosphate (the salt of primaquine most frequently employed). This is due to exchange of phosphoric acid to pyrimethamine. It is consequently necessary to convert the pyrimethamine to a salt, conveniently to the monophosphate.

*Example 1*

PYRIMETHAMINE PHOSPHATE 600 grams of pyrimethamine base is placed in a suitable mixer and wetted with 300 cc. of water, 278.25 grams of 85 percent phosphoric acid is diluted with 50 cc. of water and mixed with the damp pyrimethamine. A further 25 cc. of water is added, the slurry is mixed thoroughly, spread on trays and dried at 43° C.

*Example 2*

COMPRESSED TABLETS OF 25 MG. PYRIMETHAMINE PHOSPHATE AND 20 MG. OF PRIMAQUINE DIPHOSPHATE

| Ingredients | For One Product, mg. | For 250,000 Products, g. |
|---|---|---|
| Pyrimethamine Monophosphate | 35 | 8,750 |
| Primaquine Diphosphate | 35 | 8,750 |
| Lactose | 87 | 21,750 |
| Starch dry | 24 | 6,000 |
| Magnesium Stearate | 2 | 500 |
| Glyceryl Monostearate | 1.4 | 350 |
| Sodium Lauryl Sulfate | 0.6 | 150 |

Sift separately the pyrimethamine monophosphate, primaquine diphosphate, lactose and starch through a 60 mesh sieve, using an electric riddle, mix in a small Porter blender for 15 minutes. Wet with 20 percent gum acacia solution in the Day mixer and granulate by passing through a Fitz D comminuter at a medium speed fitted with a ¼ inch screen, dry at 100° C. overnight.

Sift the magnesium stearate, glyceryl monostearate and sodium lauryl sulfate and mix well with the dry granule in a small Porter blender. Compress 185 mg. portions on a 3-B single punch machine No. 86 s./c. punches.

Tablets so prepared keep better and are more palatable if sugar coated. This can be done by any of the conventional sugar coating methods.

In the compressed tablets, other salts of pyrimethamine such as hydrochloride sulfate, etc., may be used instead of the phosphate and other salts of primaquine may also be employed. As a practical matter, it is convenient to have the same acid used for neutralizing the two bases.

Tablets of twice this size may be prepared. However, it is more convenient to prepare small tablets, giving one to a child and two to an adult as indicated in the proportions recommended previously.

"DARAPRIM" WITH PRIMAQUINE—DOSAGE BY WEIGHT [1]

| Lbs. | Kg. | D+P (as mg. of base) |
|---|---|---|
| (Approximate) | | |
| over 100 | over 45 | 50+40 |
| 51-100 | 21-45 | 25+20 |
| 25-50 | 10-20 | 12.5+10 |

[1] For long-term mass eradication programs in endemic areas, this dose is to be repeated once-weekly.

In the appended claims, the parts, proportions, ratios and weights in "milligrams" are expressed in terms of equivalent 2,4-diamino-5-(p-chlorophenyl)-6-ethylpyrimidine base and equivalent 8-(4-amino-1-methylbutylamino)-6-methoxyquinoline base.

What I claim is:

1. A composition of approximately 45 to 55 parts of 2,4-diamino-5-(p-chlorophenyl)-6-ethylpyrimidine and approximately 35 to 50 parts of 8-(4-amino-1-methylbutylamino)-6-methoxyquinoline, and a pharmaceutically acceptable carrier.

2. A composition in tablet form of a mixture of approximately 45 to 55 parts of 2,4-diamino-5-(p-chlorophenyl)-6-ethylpyrimidine and approximately 35 to 50 parts of 8-(4-amino-1-methylbutylamino)-6-methoxyquinoline and a pharmaceutically acceptable carrier.

3. A process for preparing an antimalarial composition which comprises mixing together approximately 45 to 55 parts of 2,4-diamino-5-(p-chlorophenyl)-6-ethylpyrimidine and approximately 35 to 50 parts of 8-(4-amino-1-methylbutylamino)-6-methoxyquinoline and a pharmaceutically acceptable carrier.

4. A process for the elimination of malaria which comprises the administration to a host a composition of approximately 45 to 55 parts of 2,4-diamino-5-(p-chlorophenyl)-6-ethylpyrimidine and approximately 35 to 50 parts of 8-(4-amino-1 - methylbutylamino) - 6 - methoxyquinoline.

5. A process for the elimination of malaria which comprises the administration to a host a composition of about 50 milligrams of 2,4-diamino-5-(p-chlorophenyl)-6-ethylpyrimidine and about 40 milligrams of 8-(4-amino-1-methylbutylamino)-6-methoxyquinoline.

References Cited in the file of this patent

Facts and Comparisons, June 30, 1959, p. 300.
Burger, Medicinal Chemistry, 2nd ed., 1960, Interscience, New York, pp. 817, 829, and 840.